(12) United States Patent  
Malvar

(10) Patent No.: US 8,165,389 B2
(45) Date of Patent: Apr. 24, 2012

(54) ADAPTIVE INTERPOLATION WITH ARTIFACT REDUCTION OF IMAGES

(75) Inventor: Henrique S. Malvar, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 991 days.

(21) Appl. No.: 12/133,402

(22) Filed: Jun. 5, 2008

(65) Prior Publication Data

US 2008/0240559 A1 Oct. 2, 2008

Related U.S. Application Data

(63) Continuation-in-part of application No. 11/046,324, filed on Jan. 29, 2005, now Pat. No. 7,643,676, and a continuation-in-part of application No. 10/801,450, filed on Mar. 15, 2004, now Pat. No. 7,502,505.

(51) Int. Cl.
*G06K 9/00* (2006.01)

(52) U.S. Cl. ........................................ 382/162; 382/167

(58) Field of Classification Search .................. 382/162, 382/167, 254, 260, 261, 262, 263, 264, 299, 382/300; 348/246, 441; 358/525
See application file for complete search history.

(56) References Cited

U.S. PATENT DOCUMENTS

| | | | |
|---|---|---|---|
| 3,971,065 A | 7/1976 | Bayer | |
| 4,724,395 A | 2/1988 | Freeman | |
| 5,373,322 A * | 12/1994 | Laroche et al. | ............... 348/273 |
| 5,506,619 A | 4/1996 | Adams, Jr. et al. | |
| 5,805,217 A | 9/1998 | Lu et al. | |
| 6,654,492 B1 | 11/2003 | Sasai | |
| 6,771,828 B1 | 8/2004 | Malvar | |
| 6,781,626 B1 * | 8/2004 | Wang | ............................ 348/273 |
| 6,847,396 B1 | 1/2005 | Lin | |
| 7,088,392 B2 | 8/2006 | Kakarala et al. | |
| 7,236,191 B2 * | 6/2007 | Kalevo et al. | ............... 348/222.1 |
| 2002/0015447 A1 | 2/2002 | Zhou | |
| 2002/0167602 A1 | 11/2002 | Nguyen | |
| 2005/0146629 A1 | 7/2005 | Muresan | |

(Continued)

FOREIGN PATENT DOCUMENTS

EP 0732859 A2 9/1996

OTHER PUBLICATIONS

Li, et al., "New Edge-Directed Interpolation", IEEE Transactions on Image Processing, vol. 10, No. 10, Oct. 2001, pp. 1521-1527.

(Continued)

*Primary Examiner* — Brian Le
(74) *Attorney, Agent, or Firm* — Lyon & Harr, LLP; Katrina A. Lyon

(57) ABSTRACT

An adaptive interpolation technique with artifact reduction is described that technique generates digital images with full-color RGB (red, green, blue) information, from raw pictures (e.g., Bayer-mosaiced single-color images) created by single-CCD digital cameras. The technique employs an improved criterion for choosing the interpolation criterion, which takes into account an output interpolated value. It employs small changes to filter coefficients, for better results and accommodation of "correction attenuation". In one embodiment, the technique further employs a "correction attenuation" step, which reduces "color sprinkling" artifacts for certain kinds of diagonal edges. The technique makes only a single pass over the image; all colors are interpolated during that pass, vice the multiple passes required by other better performing algorithms (in some cases over ten).

18 Claims, 9 Drawing Sheets

U.S. PATENT DOCUMENTS

| | | |
|---|---|---|
| 2005/0200733 A1 | 9/2005 | Malvar |
| 2005/0201616 A1 | 9/2005 | Malvar et al. |
| 2006/0087567 A1 | 4/2006 | Guarnera et al. |
| 2007/0133902 A1 | 6/2007 | Kumar |
| 2007/0177033 A1 | 8/2007 | Bennett et al. |
| 2007/0285432 A1 | 12/2007 | Stewart |

OTHER PUBLICATIONS

Farsiu, et al., "Multiframe Demosaicing and Super-Resolution of Color Images", IEEE Transactions on Image Processing, vol. 15, No. 1, Jan. 2006, pp. 141-159.

Patti, et al., "Artifact Reduction for Set Theoretic Super Resolution Image Reconstruction with Edge Adaptive Constraints and Higher-Order Interpolants", IEEE Transactions on Image Processing, vol. 10, No. 1, Jan. 2001, pp. 179-186.

Alleysson, et al., "Linear Demosaicing inspired by the Human Visual System", IEEE Transactions on Image Processing, vol. 14, No. 4, Apr. 2005, pp. 1-12.

Kakarala, et al., "Adaptive demosaicing with the principal vector method", IEEE Transactions on Consumer Electronics, vol. 48, Issue 4, Nov. 2002, pp. 932-937.

Malvar, et al., "High-Quality Linear Interpolation for Demosaicing of Bayer-Patterned Color Images", IEEE International Conference on Acoustics, Speech, and Signal Processing, 2004, vol. 3, 4 Pages.

Ramanath, et al., "Demosaicking methods for bayer color arrays", Journal of Electronic Imaging, vol. 11(3), 2002, pp. 306-315.

James E. Adams, "Design of practical color filter array interpolation algorithms for digital cameras .2", International Conference on Image Processing, 1998, vol. 1, pp. 488-492.

Hirakawa, et al., "Adaptive Homogeneity-Directed Demosaicing Algorithm", IEEE Transactions on Image Processing, vol. 14, No. 3, Mar. 2005, pp. 360-369.

Gunturk, et at., "Color Plane Interpolation UsingAlternating Projections", IEEE Transactions on Image Processing, vol. 11, No. 9, Sep. 2002, pp. 997-1013.

Ron Kimmel, "Demosaicing: Image Reconstruction from Color CCD Samples", IEEE Transactions on Image Processing, vol. 8, No. 9, Sep. 1999, pp. 1221-1228.

Chang, E., S. Cheung, D. Y. Pan, Color filter array recovery using a threshold-based variable number of gradients, Proceedings of SPIE, Sensors, Cameras, and Applications for Digital Photography, Nitin Sampat, Thomas Yeh, Editors, Mar. 1999, pp. 26043, vol. 3650.

Koh, C. C., J. Mukherjee, and S. K. Mitra, New efficient methods for image compression in digitial cameras with color filter array, IEEE Transactions on Consumer Electronics, Nov. 2003, pp. 1448-1456, vol. 49, No. 4.

Longére, P., X. Zhang, P. B. Delahunt, D. H. Brainard, Perceptual assessment of demosaicing algorithm performance, Proceedings of the IRRR, Jan. 2002, pp. 123-132, vol. 90, No. 1.

Lux, P., A novel set of closed orthogonal functions for picture coding, Arch. Elek. Übertragung, vol. 31, pp. 267-274, 1977.

Malvar, H., and G. Sullivan, YCoCg-R: A color space with RGB reversibility and low dynamic range, Joint Video Team (JVT) of ISO/IEC MPEG & ITU-T VCEG (ISO/IEC JTC1/SC29/WG11 and ITU-T SG16 Q.6), JVT PExt Ad Hoc Group Meeting: Jul. 22-24, 2003, Norway, Trondheim Document: JVT-I014.

Pe, S.-C., L.-K. Tam, Effective color interpolation in CCD color filter array using signal correlation, Int'l Conf on Image Processing, 2000, pp. 488-491, vol. 3.

Brian Q. Le, U.S. Appl. No. 10/801,450, Notice of Allowance, Nov. 11, 2009.

Colin Larose, U.S. Appl. No. 10/801,450, Final Office Action, Aug. 26, 2008.

Colin Larose, U.S. Appl. No. 10/801,450, Office Action, Mar. 26, 2008.

Amir Alavi, U.S. Appl. No. 10/968,236, Notice of Allowance, Jun. 16, 2008.

Brian Q. Le, U.S. Appl. No. 11/046,324, Notice of Allowance, Jun. 26, 2009.

Brian Q. Le, U.S. Appl. No. 11/046,324, Final Office Action, Dec. 22, 2008.

Colin Larose, U.S. Appl. No. 11/046,324, Office Action, Jun. 20, 2008.

\* cited by examiner

ADAPTIVE INTERPOLATION WITH ARTIFACT REDUCTION OF IMAGES

This is a continuation-in-part of application Ser. No. 11/046,324 filed Jan. 29, 2005 and entitled "A SYSTEM AND METHOD FOR ADAPTIVE INTERPOLATION OF IMAGES FROM PATTERNED SENSORS" which is a continuation-in-part of application Ser. No. 10/801,450, filed Mar. 15, 2004, entitled "HIGH-QUALITY GRADIENT-CORRECTED LINEAR INTERPOLATION FOR DEMOSAICING OF COLOR IMAGES".

BACKGROUND

Digital cameras are steadily increasing in popularity due to their declining costs, which make them well within the reach of the average consumer. In order to keep costs low, many color digital cameras are single-sensor digital cameras in which only a single image sensor is used to capture color information for each picture element (pixel) in a color image. Each image sensing element in a single-sensor digital camera, which is typically a charge-coupled device (CCD) or a complementary metal oxide semiconductor (CMOS) chip, is part of a sensor array that represents the pixels of a color image. In view of the color filter array that is superimposed on the sensor, each image sensing element can only generate information about a single color at a given pixel. A color image, however, is represented by combining three separate monochromatic images. In order to display a color image, all of the red, blue and green (RGB) color values are needed at each pixel. In an ideal (and expensive) camera system, each pixel in the sensor array would be provided with three image sensors, each one measuring a red, green or blue pixel color. In a single-sensor digital camera, however, only a single red, blue or green color value can be determined at a given pixel. In order to obtain the other two missing colors, a technique must be used to estimate or interpolate the missing colors from surrounding pixels in the image. For each CCD or CMOS pixel, only one color is captured, either R, G, or B. Therefore, it is necessary to interpolate the data to generate the other two colors at every pixel. For example, the pixel marked with a 'x' in FIG. 1 is a "red pixel", that is, at that location only the red color value is produced by the corresponding image sensing element. To obtain the green (G) and blue (B) values for that pixel, one needs to interpolate the green and blue data available from neighboring pixels. For example, to obtain the green value for the 'x' pixel 102 in FIG. 1, one could perform a bilinear interpolation based on the values of the green pixels marked 'o'.

Estimating or interpolating missing colors as discussed above is called "demosaicing". The "demosaicing" term is derived from the fact that a color filter array (CFA) is used in front of the image sensors, with the CFA being arranged in a mosaic pattern. This mosaic pattern has only one color value for each of the pixels in the image. In order to obtain the full-color image, the mosaic pattern must be "demosaiced". Thus, demosaicing is the technique of interpolating back from the image captured with a mosaic-pattern CFA, so that a full RGB value can be associated with every pixel. More specifically, a single-sensor digital camera captures the image using an image sensor array that is preceded in the optical path by a CFA. A highly common mosaic CFA is called the Bayer mosaic pattern. The Bayer mosaic pattern (or Bayer filter 100) is shown in FIG. 1. (In this figure, the boxes with an "R" 104 represent red pixels, the boxes with a "G" 106 represent green pixels and the pixels with a "B" 108 represent blue pixels. The boxes with "0" 110 markings are also green pixels, while the box marked "X" 112 is also a red pixel.) For each 2×2 set of pixels, two diagonally opposed pixels have green filters, and the other two pixels have red and blue filters. Since the color green (G) carries most of the luminance information for humans, its sampling rate is twice that of the color red (R) and the color blue (B).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The adaptive interpolation with artifact reduction technique described herein generates digital pictures with full-color RGB (red, green, blue) information, from raw pictures (e.g., Bayer-mosaiced single-color images) created by a single-CCD (or CMOS) digital camera. This technique efficiently performs high-quality demosaicing, using a set of linear filters. The coefficients of these filters approximate statistically-optimal Wiener filters, and allow fast implementation that preferably use no multiplication operations, just additions and shifts (although multiplications can be used if the processing hardware supports fast multiplications).

The technique employs an improved criterion for choosing the interpolation criterion, which takes into account an output interpolated value. It employs small changes to filter coefficients, for better results and accommodation of "correction attenuation". In one embodiment, the technique further employs a "correction attenuation" step, which reduces "color sprinkling" artifacts for certain kinds of diagonal edges. The technique makes only a single pass over the image; all colors are interpolated during that pass, vice the multiple passes required by other better performing algorithms (in some cases over ten).

In one embodiment, following a regular raster scanning order (from left to right and top to bottom), for each pixel location, the adaptive interpolation with artifact reduction technique first determines horizontal and vertical gradients (whose computation depends on the available color for that pixel). It also computes an activity metric for each of the horizontal and vertical directions that takes into account candidate output interpolated pixel values. The technique chooses the best interpolation direction, from one of three options: horizontal, vertical, or non-directed, based on the values of the horizontal and vertical gradients and the horizontal and vertical activity metrics. In the case of a non-directed filter, there is a higher risk of the presence of artifacts in the output values (especially of the "color sprinkling" kind, where a pixel has a significantly different color from its immediate neighbors). In this case, in one embodiment, the technique applies an additional step of attenuating a term that contributes to high-frequency components in the interpolated output.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
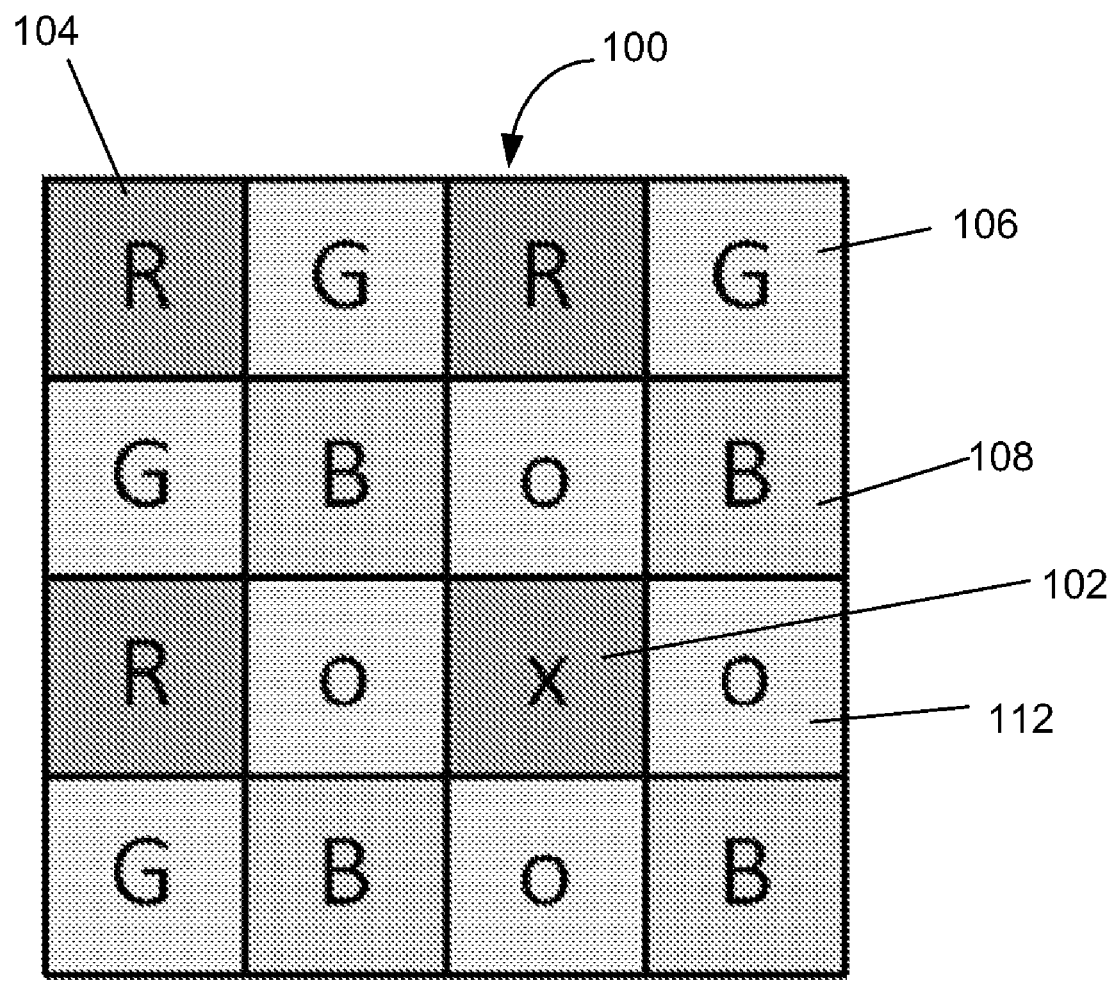
FIG. 1 illustrates a Bayer mosaic pattern. This is a typical Bayer mosaic for color image capture in single-CCD digital cameras; the G sub-image has twice as many pixels as the R and B sub-images.

In the following description of the adaptive interpolation with artifact reduction technique, reference is made to the accompanying drawings, which form a part thereof, and which is shown by way of illustration examples by which the adaptive interpolation with artifact reduction technique described herein may be practiced. It is to be understood that other embodiments may be utilized and structural changes may be made without departing from the scope of the claimed subject matter.

1.0 Adaptive Interpolation with Artifact Reduction of Images from Patterned Sensors The adaptive interpolation with artifact reduction technique described herein generates digital pictures with full-color RGB (red, green, blue) information, from raw pictures created by single-CCD (or single-CMOS) digital cameras. This process is generically called "demosaicing", because it converts a Bayer-mosaiced single-color image into a full color RGB image. This technique efficiently performs high-quality demosaicing, using a set of linear filters. The coefficients of these filters approximate statistically-optimal Wiener filters, and allow fast implementations that preferably use no multiplication operations, just additions and shifts (although multiplications can be used if the processing hardware supports fast multiplications).

In general, several basic ideas underlying the adaptive interpolation with artifact reduction technique are:

1) The technique employs an improved criterion for choosing the interpolation direction, which takes into account an output interpolated value.
2) The technique employs small changes to filter coefficients, for better results and accommodation of "correction attenuation".
3) The technique, in one embodiment, further employs a "correction attenuation" step, which reduces "color sprinkling" artifacts for certain kinds of diagonal edges.
4) The technique makes only a single pass over the image; all colors are interpolated during that pass, vice the multiple passes required by other better performing demosaicing algorithms (in some cases over ten).

The adaptive interpolation with artifact reduction technique performs better than the well-known state-of-the-art for commercial in-camera applications, with removal of "zipper" and "color sprinkling" artifacts, at reduced complexity. It has a performance comparable to the current state-of-the-art algorithms, but with a reduced computational complexity and much reduced memory footprint.

The following sections provide a brief background description useful in understanding the concept of demosaicing, a brief description of previous work described in the co-pending patent applications, an exemplary architecture wherein the adaptive interpolation with artifact reduction technique can be practiced, exemplary processes employing the technique and details of various implementations of the technique.

1.1 Demosaicing Background

There are multitudes of demosaicing techniques available. One of the simplest approaches to demosaicing is bilinear interpolation. In general, bilinear interpolation uses three color planes that are independently interpolated using symmetric bilinear interpolation. This interpolation uses a pixel's nearest neighbors having the same color as the color that is being interpolated. In particular, referring again to FIG. 1, in bilinear interpolation the green value g(i,j) at a pixel position (i,j) that falls in a red or blue pixel is computed by the average of the neighboring green values in a cross pattern, as follows, $$\hat{g}(i,j) = \frac{1}{4} \sum_{(m,n)=\{(0,-1),(0,1),(-1,0),(1,0)\}} g(i+m, j+n) \quad (1)$$

Equation (1) corresponds to estimating the green value at the pixel marked 'X' (also called the "current pixel") in FIG. 1 as the average of the observed green values marked 'o'. It should be noted that the current pixel has a red color (denoted by R), and therefore the green and blue color values need to be interpolated. At image boundaries, only pixels that fall within the image are included, and the scaling adjusted.

Bilinear techniques typically use a small region of support. The region of support is the size of a pixel neighborhood whose values are considered for the interpolation of any given pixel. The region of support for most bilinear interpolation techniques typically is a 3×3 pixel region of support. Using this small of a region of support keeps memory usage and computational complexity to a minimum.

However, many bilinear interpolation techniques generate significant artifacts in the resultant color image. This is especially true across edges and other high-frequency content in the image, because bilinear interpolation does not consider the statistical correlation among RGB values, and also because it does not make use of the known value of the known color value at the current pixel location (because it's a different color). Thus, while bilinear interpolation techniques are fast, computationally non-intensive, and easy to implement, they are also notorious for producing low-quality images due to the significant artifacts (mainly blurriness and color fringing) that they generate.

Better, though more complex, interpolation techniques take the correlation among RGB values into account. One group of interpolation techniques considers such correlation by using improved nonlinear filters, such as median operators. These nonlinear filters essentially adapt interpolation smoothness to a measure of image activity or edginess.

Exploiting correlation among RGB channels is the main idea behind improving demosaicing performance in nonlinear interpolation techniques. Specifically, it can be assumed that in a luminance/chrominance decomposition, the chrominance components do not vary much across pixels. In a constant-hue approach, the green channel is bilinearly interpolated and then the red and blue channels are interpolated so as to maintain a constant hue, defined as the R/G and B/G ratios. However, one problem with this technique is that even at the expense of computing these ratios, the technique still produces visible artifacts. Moreover, using complex operations (such as division and multiplication) in the computing of interpolations greatly increases the computational complexity, processing overhead, and implementation cost.

Improved results for nonlinear interpolation techniques can be obtained by starting with bilinearly interpolated green pixels and then applying median filters to the interpolated values of the color differences R−G and B−G. Improved performance can be obtained by using gradient-based nonlinear techniques, which typically estimate edge directions and adjust the interpolation formulas so that filtering is performed preferentially along edge directions, and not across them. However, most other nonlinear interpolation methods, interpolate the green pixel values first and then use these green values to interpolate the blue and red values. This requires two passes of the image in order to interpolate all red, green and blue color values which greatly increases the time necessary to interpolate the missing colors in an image.

Iterative methods can lead to further improvement by using results from blue and red interpolations to correct the green interpolation, and vice-versa. In such techniques more than one pass across the image is required to interpolate the red, green and blue pixel values, making these techniques slow and computationally inefficient. Additionally, these techniques have a very high complexity (e.g. as many as 480 operations per input pixel for techniques using alternating projections).

The above-described nonlinear interpolation techniques typically use a larger region of support that is used in bilinear interpolation techniques. For example, a 5×5 pixel region of support is typical for these nonlinear techniques. A 5×5 region of support allows more opportunities for exploiting correlation between RGB values and produce high-quality images. A smaller region of support greatly reduces the image quality, while larger regions of support require more memory and increase computational complexity.

1.2 Previous Work

In a co-pending patent application entitled "HIGH-QUALITY GRADIENT-CORRECTED LINEAR INTERPOLATION FOR DEMOSAICING OF COLOR IMAGES" filed on Mar. 15, 2004 and assigned Ser. No. 10/801,450, incorporated herein by reference, by H. S. Malvar, L.-W. He, and R. Cutler, an interpolation approach was defined that linearly combines a correction term with an interpolation to obtain a high-quality estimate of a missing pixel color at a pixel within the image. This interpolation technique for demosaicing color images is simple and has a speed similar to that of bilinear interpolation, while producing the high-quality images of more complex techniques. However, the interpolated image quality sometimes suffers when interpolation takes place across horizontal and vertical edges, and resulting interpolated images are still subject to artifacts at these points. The artifacts are much attenuated when compared to straight bilinear interpolation, but they can still be noticed in some cases. This previous linear demosaicing technique aims at fast computation. It employs a set a near-optimal fixed linear filters, in the sense of approximating closely optimal linear Bayesian estimators based on a pre-computed set of image statistics (i.e. Wiener filters). While performing better than most nonlinear algorithms in terms of mean-square error (MSE, measured with respect to the reference 3-CCD image), this linear demosaicer may still lead to noticeable color fringing artifacts ("zipper" or "color sprinkling" effects) near edges. The main advantages of this linear technique are simplicity and low computational cost (just a small set of fixed interpolation filters), and also a minimal memory footprint: no additional image buffering is needed beyond the buffer that stores the interpolated output image.

Another co-pending patent application by H. S. Malvar entitled "A SYSTEM AND METHOD FOR ADAPTIVE INTERPOLATION OF IMAGES FROM PATTERNED SENSORS", filed on Jan. 29, 2005, and assigned Ser. No. 11/046,324, also incorporated herein by reference, provided a high-quality interpolation technique that considers correlation among RGB values to improve performance and computational efficiency. This interpolation technique improved performance (lower MSE, reduced artifacts) with respect to the linear algorithm described in the aforementioned co-pending patent application entitled "HIGH-QUALITY GRADIENT-CORRECTED LINEAR INTERPOLATION FOR DEMOSAICING OF COLOR IMAGES" by making it adaptive: at every pixel a decision is made on whether there is a significant edge in the horizontal or vertical direction. If so, then interpolation filters are chosen that use pixels values only in the direction alongside the edge (that is, horizontal interpolation if there is a horizontal edge, and vertical interpolation if there is a vertical edge). Otherwise, old non-directional filters are used. The horizontal and vertical filters are also defined as easily-computable approximations to optimal Wiener filters under the directional constraint. That way, one set of filters is replaced by three sets: horizontal, vertical, and non-directional filters. To make the decision at each pixel, a simple rule is used for computing directional gradients. That kind of adaptation leads to improved results, but some artifacts can still be presented, especially for raw images that are not appropriately lowpass-filtered by a camera lens before hitting the Bayer-patterned CCD. The performance of this adaptive algorithm was re-examined with other images with a relatively high level of aliasing (e.g. if the optics are too sharp). Two important aspects were found: 1) most of the artifacts were the results of incorrect decisions of the interpolation direction, and 2) the quality of the horizontal and vertical interpolation filters could be improved.

The adaptive interpolation with artifact reduction technique builds on this previous work to create far superior interpolated images. The following paragraphs provide exemplary implementations and details of the technique.

1.3 Exemplary Architecture

Figure 2:
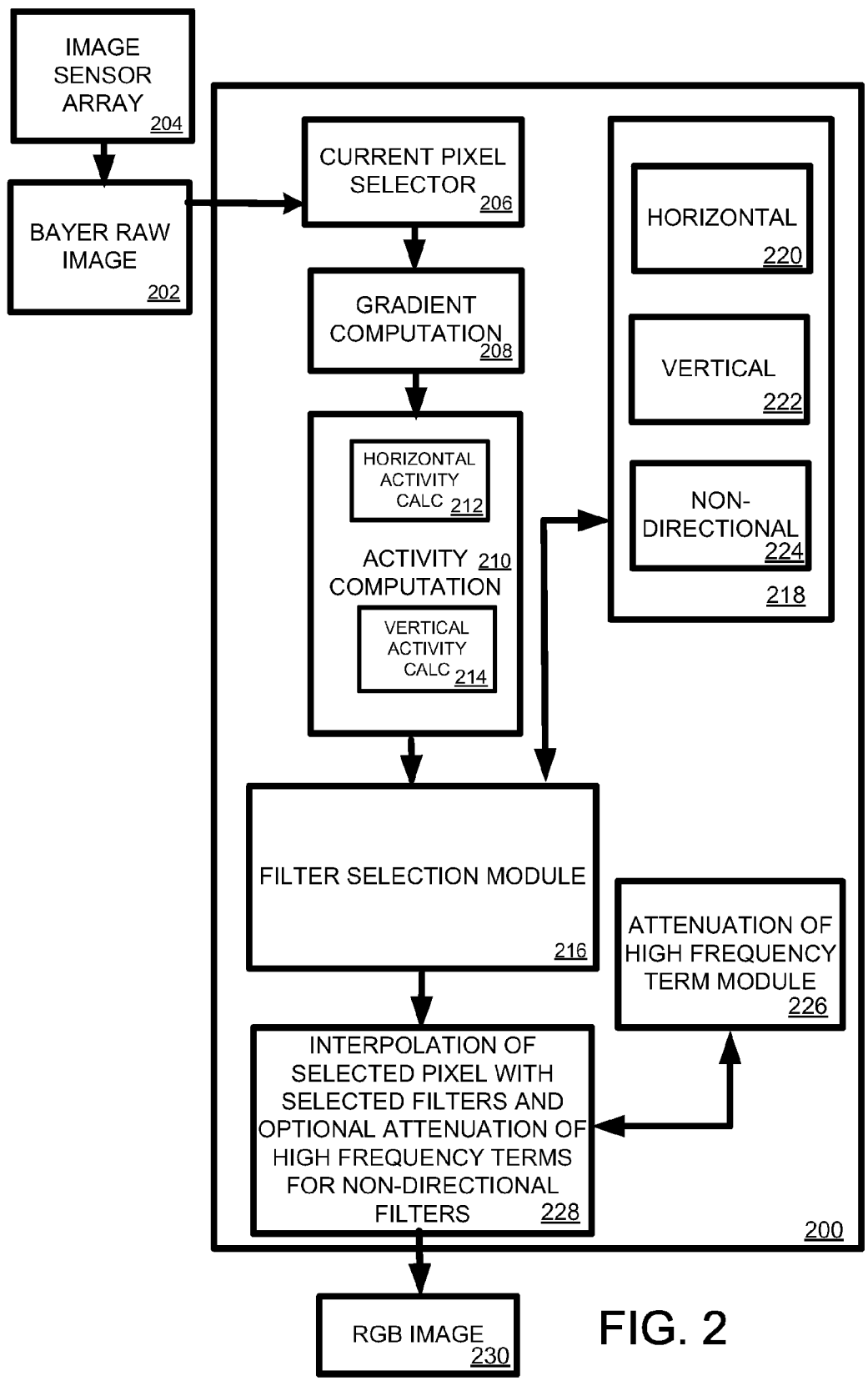
FIG. 2 provides an exemplary architecture in which the adaptive interpolation with artifact reduction technique can be practiced.

One exemplary architecture 200 in which the adaptive interpolation with artifact reduction technique can be practiced is shown in FIG. 2. (This exemplary architecture is typically located on a computing device 900, shown in FIG. 9, which will be discussed in greater detail later). The adaptive interpolation with artifact reduction architecture 200 includes a number of modules that allow it to produce a high-quality interpolation of a missing color at a pixel in a quick, simple and efficient manner.

In general, referring to FIG. 2, the adaptive filter interpolation architecture 200 inputs color information including raw, mosaic-patterned pixel data 202 produced by the image sensor array 204, processes the information, and outputs one or more missing color values for each pixel 230. More specifically, in one embodiment, the adaptive interpolation with artifact reduction architecture 200 includes a current pixel selector 206 that selects a current pixel having a current color from the raw pixel data 202 (e.g. an image array that represents a Bayer image). A gradient computation module 208 computes a gradient for both the horizontal and vertical directions at the selected pixel. An activity computation module 210 computes a horizontal activity metric for the horizontal 212 direction and a vertical activity metric for the vertical 214 direction that take into account candidate output interpolated pixels. A filter selection module 216 then selects horizontal 220, vertical 222 or non-directional 224 filters from a predetermined set of filters 218 using the computed gradients and the vertical 214 and horizontal activity metrics 212. In one embodiment of the architecture 200, filters are selected by subtracting the vertical pixel activity metric from the horizontal activity metric and if the result is less than the negative of a given threshold, the horizontal interpolation filters are used. If the result is greater than the given threshold then the vertical interpolation filters are used. Otherwise, the non-directional filters are used. In another embodiment of the architecture, filters are selected by comparing the vertical activity metric to the horizontal activity metric, and if the vertical activity is greater than the horizontal activity metric, horizontal interpolation filters are used to interpolate the missing color values at the current selected pixel. Otherwise, vertical interpolation filters are used. Once the filters are selected, an interpolation module 228 computes an interpolation of the missing color values at the current pixel. In one embodiment of the architecture 200, an attenuation module 226 is also employed to significantly reduce color sprinkling effects by attenuating high frequency components for non-directed interpolation filters.

1.4 Exemplary Processes

Figure 3:
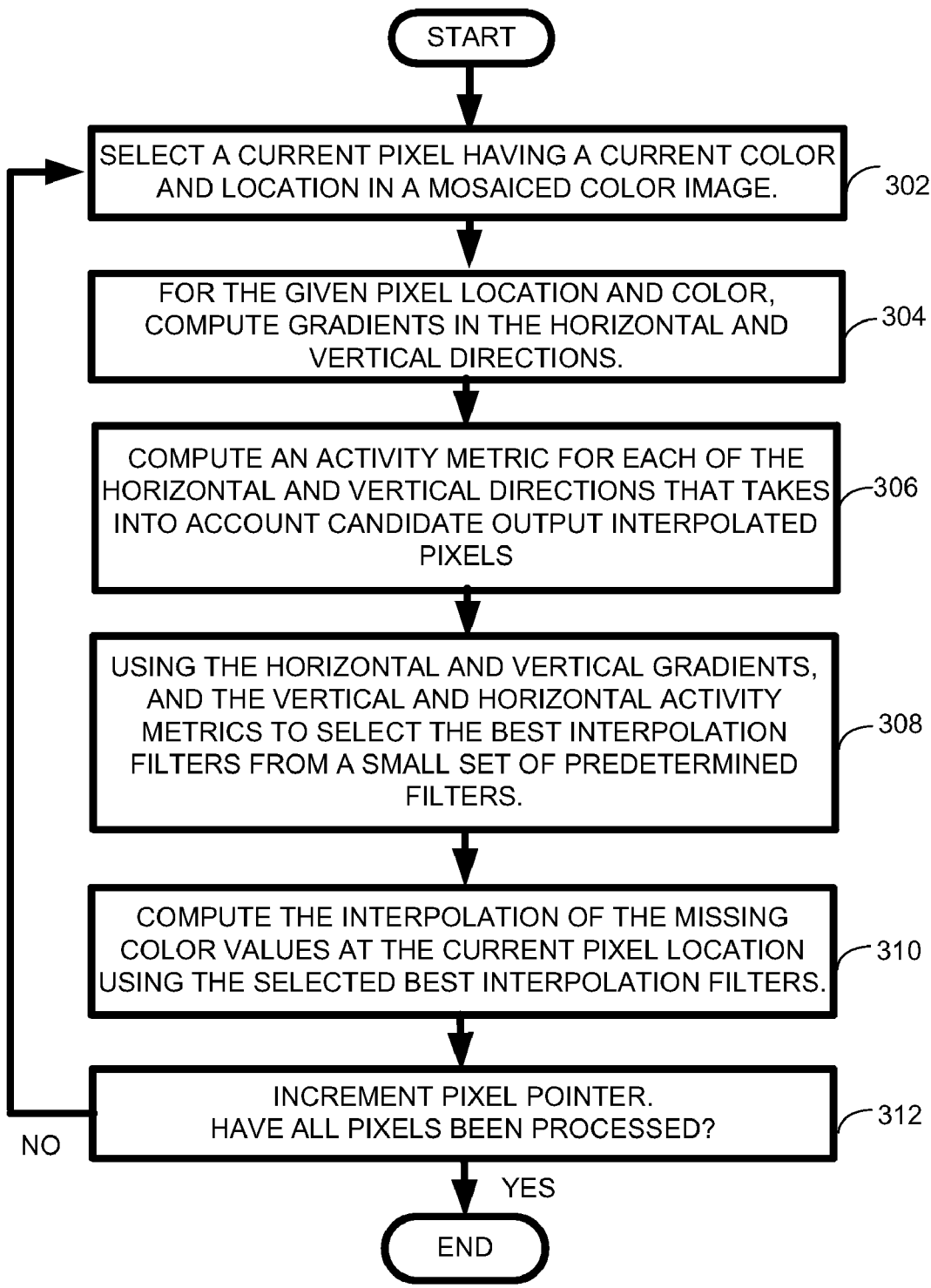
FIG. 3 provides an exemplary flow diagram of one exemplary embodiment of the adaptive interpolation with artifact reduction technique. Input pixels are in a Bayer-mosaiced pattern (only one color per pixel), and output pixels are in full RGB mode (three color values per pixel).

An exemplary process employing the adaptive interpolation with artifact reduction technique is shown in FIG. 3. As shown in FIG. 3, box 302, a current pixel having a current color and location is selected from a mosaiced color image. For the given pixel location and color, gradients in the horizontal and vertical directions are computed, as shown in box 304. This computation depends on the available color for that pixel. Activity metrics for the horizontal direction and for the vertical direction, that take into account candidate output interpolated pixels, are computed, as shown in box 306. Using the computed gradients in the horizontal and vertical directions, and the activity metrics in the horizontal and vertical directions, the best interpolation filters are chosen from a small set of predetermined interpolation filters (box 308). From those the technique chooses the best interpolation direction, in one embodiment, from one of three options: horizontal, vertical, or non-directed. The interpolation of the missing color values at the current pixel is then computed with the selected interpolation filters (box 310). The process then adjusts the memory pointers to the next pixel in the image (box 312), and then proceeds to repeat the adaptive interpolation for the next pixel, unless all pixels have been processed; if so then the process terminates. No additional passes over the image are needed. This single-pass approach is a significant advantage of the adaptive interpolation technique, when compared with previous methods.

Figure 4:
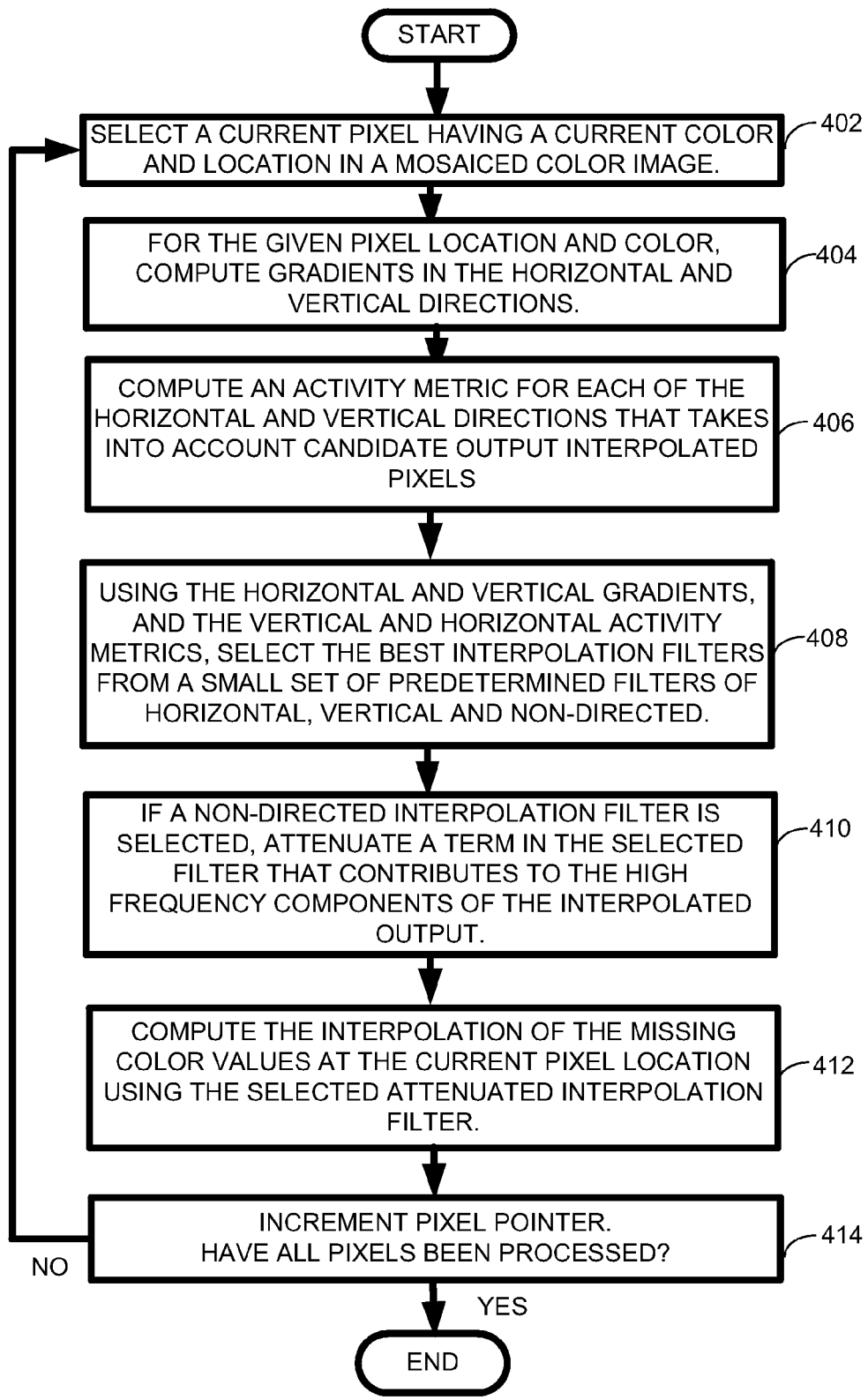
FIG. 4 provides an exemplary flow diagram of another exemplary embodiment of the adaptive interpolation with artifact reduction technique. This embodiment attenuates high frequency terms that can contribute to color sprinkling effects.

Another exemplary process of the adaptive interpolation with artifact reduction, is shown in FIG. 4. As shown in FIG. 4, box 402, a current pixel having a current color and location is selected from a mosaiced color image. For the given pixel location and color, gradients in the horizontal and vertical directions are computed, as shown in box 404. This computation depends on the available color for that pixel. An activity metric that takes into account candidate output interpolated pixels is computed for both the horizontal and the vertical directions, as shown in box 406. Using the computed gradients in the horizontal and vertical directions, and the activity metrics in the horizontal and vertical directions, the best interpolation filters are chosen from a small set of predetermined interpolation filters (box 408). From those the technique chooses the best interpolation direction, from one of three options: horizontal, vertical, or non-directed. In one embodiment this is done by using the activity metric in the horizontal direction and the activity metric in the vertical direction and comparing these to a threshold in order to determine which direction to use. In the non-directed interpolation case, there is a higher risk of the presence of artifacts in the output values (especially of the "color sprinkling" kind, where a pixel has a significantly different color from its immediate neighbors). In this case, in one embodiment, the technique applies an additional step of attenuating a term that contributes to high-frequency components in the interpolated output (box 410). The interpolation of the missing color values at the current pixel is then computed with the selected interpolation filters (box 412). As in the previous exemplary process, the process then adjusts the memory pointers to the next pixel in the image (box 414), and then proceeds to repeat the adaptive interpolation for the next pixel, unless all pixels have been processed; if so then the process terminates. No additional passes over the image are needed.

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

1.5 Exemplary Embodiments and Details.

Various alternate embodiments of the adaptive interpolation with artifact reduction technique can be implemented. The following paragraphs provide details and alternate embodiments of the exemplary architecture and processes presented above.

The adaptive interpolation with artifact reduction technique described herein is an improvement over previous algorithms described in the paragraphs above. The main improvements are: 1) Improved filters for horizontal and vertical interpolation, keeping the same filters for non-directional interpolation; 2) A much improved rule for selecting the interpolation direction. Instead of measuring only deltas in pixel values in the raw input image, the technique measures a set of these deltas as well as deltas that take into account an output pixel value (more particularly, the horizontal and vertical activity metrics seek to reduce sharp variations in that output pixel value, and thus address directly the reduction of artifacts in the output image). The simplified criterion leads to a single-pass procedure, and thus a much lower complexity; and 3) A new rule for reduction of artifacts on certain kinds of diagonal edges.

The adaptive interpolation with artifact reduction technique described herein has higher computational complexity than the previous technique described in the co-pending patent applications, because it has more arithmetic operations to be performed at every pixel to be interpolated. However, the fact that the technique is a single-pass technique does not change, and that with a simple internal buffering of a few scan lines, the technique only needs to visit each input and output pixel once. Additionally, the technique does not need to apply any filter to the output image. That leads to great cache consistency, and thus fast execution (because in modern processors memory access is typically slower than performing several arithmetic operations). Other techniques require additional computations for color space mapping and homogeneity evaluation, plus they require either multiple passes or a much more complex internal buffering structure, because lowpass filtering and color space transformation operators must be applied to the output pixels.

1.5.1 Pixel Selection

Regarding FIG. 2, box 206, FIG. 3, box 302 and FIG. 4, box 402, each pixel of a raw Bayer image, having a specific color and location, is selected for processing in order to interpolate the missing color values at each pixels. In one embodiment, pixel selection follows a regular raster scanning order (from left to right and top to bottom) in order to process the pixels of the entire image.

1.5.2 Interpolation Filters

Figure 5:
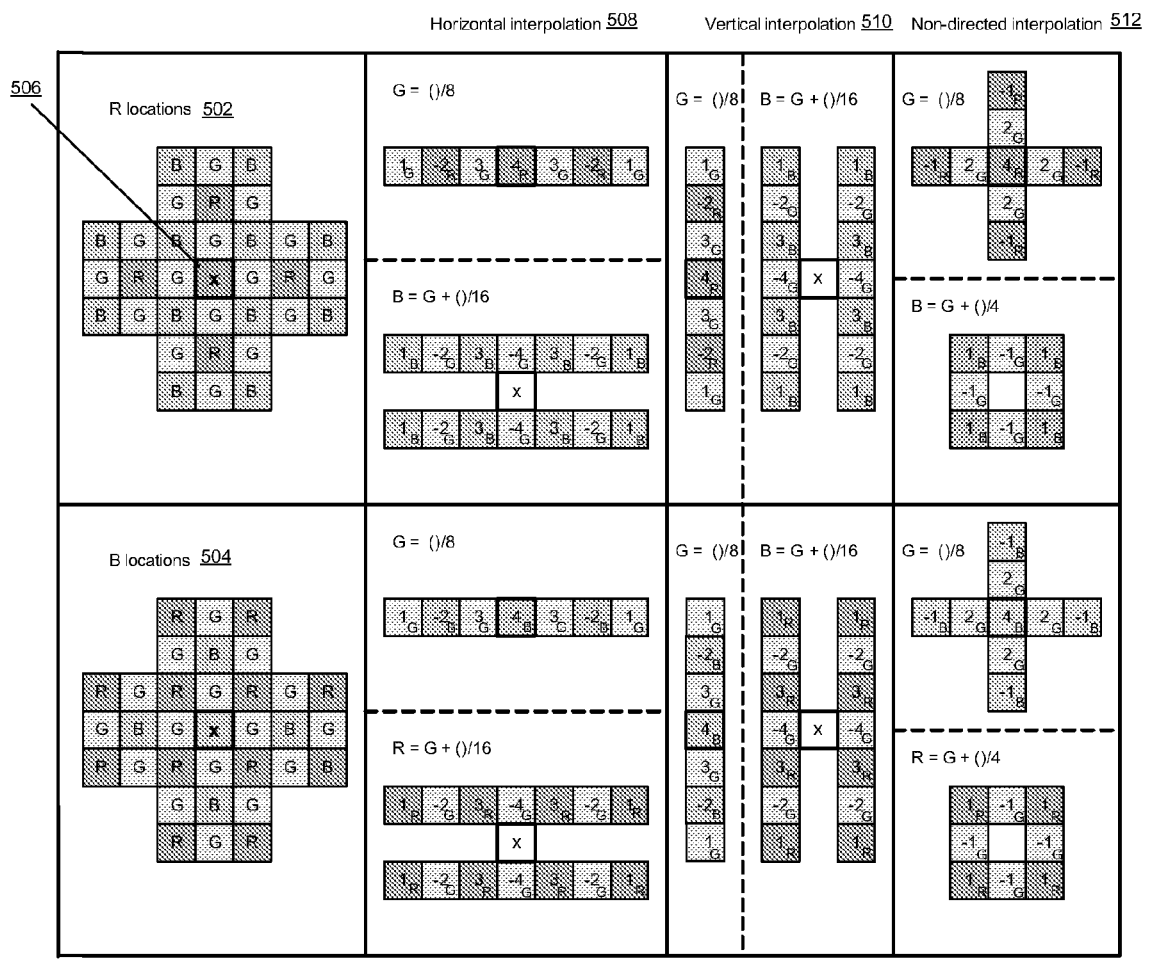
FIG. 5 provides an exemplary diagram of new interpolation filters for red and blue pixel locations employed in one embodiment of the adaptive interpolation with artifact reduction technique FIG. 6 provides an exemplary diagram of new interpolation filters for green pixel locations employed in one embodiment of the adaptive interpolation with artifact reduction technique.

As previously discussed, and shown, for example, in FIG. 2 blocks 218, 200, 222, 224, the adaptive interpolation with artifact reduction technique described herein introduces new interpolation filters for the processing of raw Bayer images. For each pixel in the output image, the technique first examines a selected pixel's position relative to the Bayer grid 100 in FIG. 1. More specifically, there are four possibilities: red pixels, blue pixels, green pixels in a red row and blue column, or green pixels in blue row and red column. The filters for the first two cases, 502 and 504, are shown in FIG. 5, where the "X" determines the pixel for which the technique wants to compute interpolated values of the two missing colors (G and B for R locations, or G and R for B locations). Note that, in one embodiment, the technique first computes the interpolated green value, and then computes the final missing color value. In the following discussion, the notation x(i,j) means the pixel value at row i and column j. For example, for the horizontal filter, in the equation for G_eb below, all terms are in the same row i, but different columns (j−3, j−1, j+1, j+3). For the term (B−G) est, the indices for row i−1 and i+1 are also being used. This is because the technique combines horizontal filters for row i with horizontal filters for rows i−1 and i+1 (that is, a kind of averaging process of horizontal filters for each of the three rows). The filter coefficients for the interpolation filters are identified in FIGS. 5, 6 and 7. These figures are annotated so that R indicates a red pixel, G indicates a green pixel, and B indicates a blue pixel. Note that the computation for a green interpolated value G_est is obtained by summing G_eb and G_ec where G_eb is the bilinearly interpolated component and G_ec is a high-frequency correction component. For example, referring to FIG. 5, for red locations 502 and the current pixel ("X") 506 at position (i,j), one has the following estimates for the missing green and blue values:

Horizontal Filters (508):
G_est=G_eb+G_ec, with $G\_eb=⅛*\{3*[x(i,j-1)+x(i,j+1)]+[x(i,j-3)+x(i,j+3)]\}$ $G\_ec=¼*\{2*x(i,j)-x(i,j-2)-x(i,j+2)\}$ B_est=G_est+(B−G)_est, with $(B-G)\_est=1/16*\{3*[x(i-1,j-1)+x(i-1,j+1)+x(i+1,j-1)+x(i+1,j+1)]+[x(i-1,j-3)+x(i-1,j+3)+x(i+1,j-3)+x(i+1,j+3)]\}-⅛*\{2*[x(i-1,j)+x(i+1,j)]+[x(i-1,j-2)+x(i-1,j+2)+x(i+1,j-2)+x(i+1,j+2)]\}$ Vertical Filters (510):
G_est=G_eb+G_ec, with $G\_eb=⅛*\{3*[x(i-1,j)+x(i+1,j)]+[x(i-3,j)+x(i+3,j)]\}$ $G\_ec=¼*\{2*x(i,j)-x(i-2,j)-x(i+2,j)\}$ B_est=G_est+(B−G)_est, with $(B-G)\_est=1/16*\{3*[x(i-1,j-1)+x(i-1,j+1)+x(i+1,j-1)+x(i+1,j+1)]+[x(i-3,j-1)+x(i-3,j+1)+x(i+3,j-1)+x(i+3,j+1)]\}-⅛*\{2*[x(i,j-1)+x(i,j+1)]+[x(i-2,j-1)+x(i-2,j+1)+x(i+2,j-1)+x(i+2,j+1)]\}$ Non-Directional Filters (512):
G_est=G_eb+G_ec, with $G\_eb=⅛*\{4*x(i,j)-[x(i-2,j)+x(i+2,j)+x(i,j-2)+x(i,j+2)]\}$ $G\_ec=¼*\{x(i-1,j)+x(i,j-1)+x(i,j+1)+x(i+1,j)\}$ $B\_est=G\_est+¼*\{[x(i-1,j-1)+x(i-1,j+1)+x(i+1,j-1)+x(i+1,j+1)]-[x(i-1,j)+x(i,j-1)+x(i,j+1)+x(i+1,j)]\}$ From FIG. 5 one also sees that the same formulas hold for the interpolated G_est and R_est values at blue pixels; in one embodiment of the adaptive interpolation with artifact reduction technique this fact is used to simplify writing a computer program to implement the technique.

The formulas above require only integer arithmetic. For example, v=(1/16)*u can be implemented as v=(u+8)>>4, and v=3*u can be implemented as v=u+(u<<1). Thus, all formulas can be implemented efficiently using only additions and shifts, if needed.

The structure of the filters shown in FIG. 5 leads to two important observations. First, one computes the green interpolated value as a sum of two components: (1) a directional lowpass-filtered value, in case of horizontal or vertical interpolation, or a bilinearly interpolated value, in case of non-directional interpolation; (2) a correction factor, which is computed by applying a short-kernel highpass filter (directional, as per the interpolation direction) to pixels color of the current pixel. The motivation behind this correction is that if a sharp transition is seen in the current color, a transition of the same amplitude is likely to exist in green, as well, because sharp variations in luminance are much more likely than sharp variations in chrominance. Secondly, the second missing color (blue for red pixels, or red for blue pixels) is computed by adding to the interpolated green value an estimate of the color difference B−G (for R locations) or R−G (for B locations). One computes that estimate via a (possibly directional) lowpass filter applied to neighboring B and G values (for R locations) or R and G values (for B locations).

Figure 6:
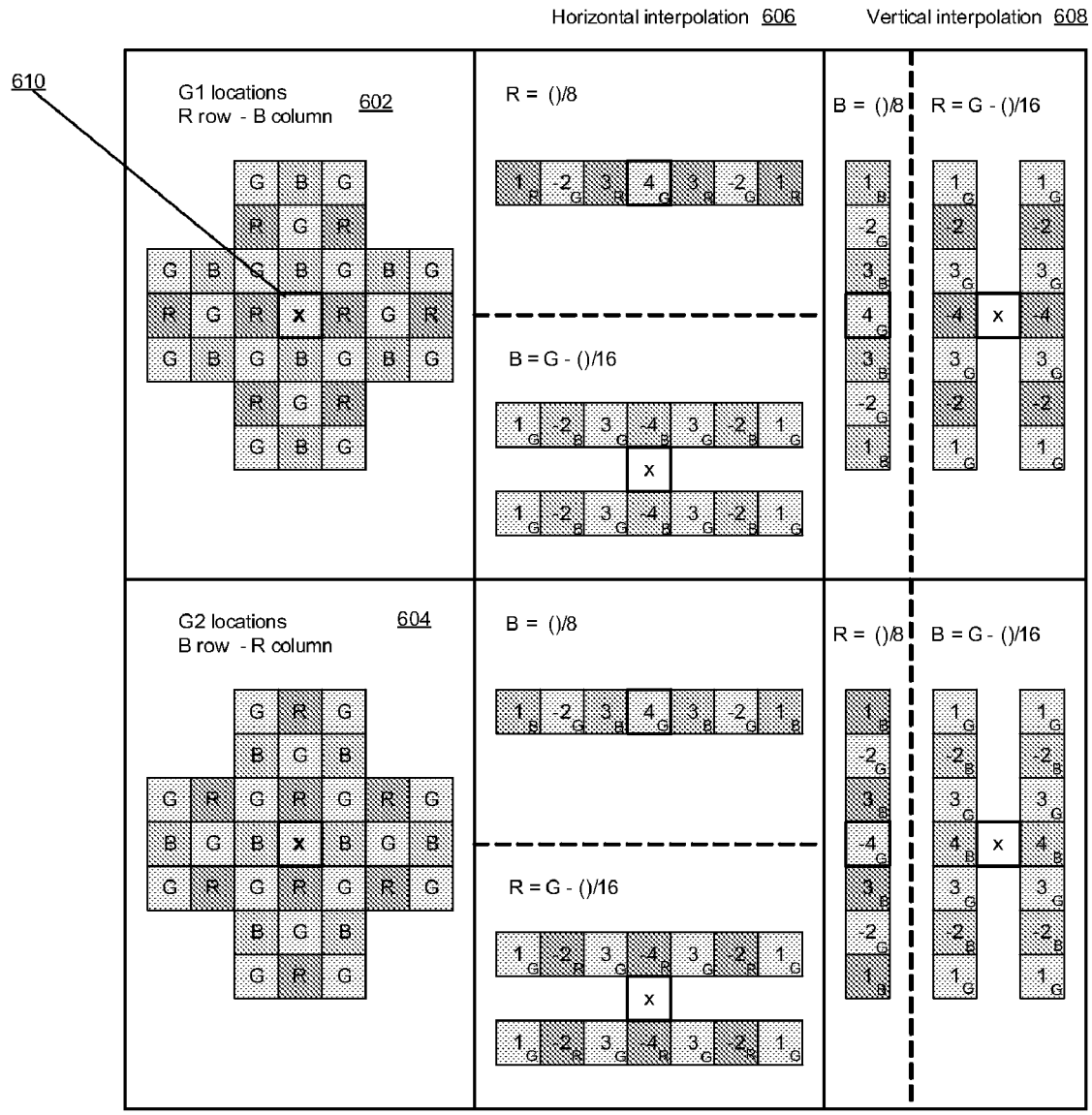

For the green (G) locations 602 and 604, the technique uses only horizontally-oriented 606 or vertically-oriented 608 filters, as shown in FIG. 6. One notes that given the current green pixel ("X") 610 at position (i,j), the filter patterns are the same as in the previous two cases, and thus one can use the same formulas. This simplifies implementation of the technique.

1.6.4 Interpolation Direction Decision

A key point for the reduction of demosaicing artifacts is choosing well in which direction to interpolate. This is where the technique described herein brings a significant improvement over the previous one described in the aforementioned co-pending patent application entitled "A SYSTEM AND METHOD FOR ADAPTIVE INTERPOLATION OF IMAGES FROM PATTERNED SENSORS". A key idea in the adaptive interpolation with artifact reduction technique is to measure "high-frequency activity", or simply activity, as a metric of how fast pixel values are changing. The previous technique uses a simple gradient-like metric such as horizontal activity=abs{2*x[i, j]−x(i,j−2)−x(i,j+2)}, in which it is important to measure the difference two pixels away, so that changes in pixel values of the same color were compared. However, measuring the jump of two positions leads to aliasing problems at high frequencies; for example, if the image has vertical stripes that change rapidly in intensity from a column to another (that is, with significant signal energy at the highest possible horizontal spatial frequency), the horizontal activity metric above may end up having a small value, as if it were in a nearly flat background region. Thus, in one embodiment, the adaptive interpolation with artifact reduction technique described herein includes an important variation: the technique first computes the horizontal and vertical estimates for the missing colors at the current pixel. Then, it includes in the activity estimate a measure the absolute difference between that interpolated value and its immediate neighbors. Including deltas with only one pixel difference reduces the aliasing problems just discussed. Additionally, seeking to interpolate in the direction of lower activity favors choosing the output interpolated value (from H or V directions) that leads to a smoother output image, thus directly addressing the reduction of artifacts in the output image.

Figure 7:
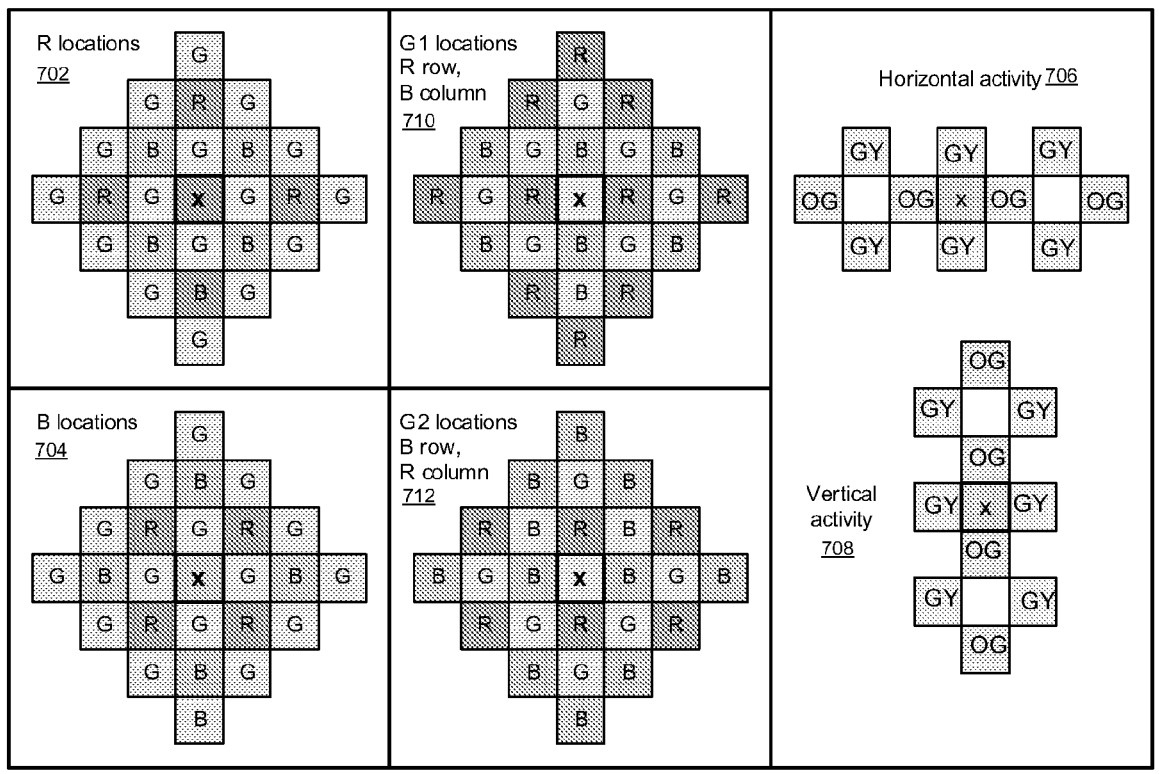
FIG. 7 provides an exemplary diagram of filters for computing activity estimators employed in one exemplary embodiment of the adaptive interpolation with artifact reduction technique.

The technique computes horizontal and vertical activity measures, AH and AV respectively, using pixel values from the positions marked Og and Gy in FIG. 7. For pixels in a red or blue (i,j) location 702, 704, the technique computes the horizontal and vertical activity metrics (AH 706 and AV 708) by $$AH=2*\{|G\_est(H)-x(i,j-1)|+|G\_est(H)-x(i,j+1)|+|x(i,j-3)-x(i,j-1)|+|x(i,j+3)-x(i,j+1)|\}+|x(i-1,j-2)-x(i-1,j)|+|x(i-1,j+2)-x(i-1,j)|+|x(i+1,j-2)-x(i+1,j)|+|x(i+1,j+2)-x(i+1,j)|$$

$$AV=2*\{|G\_est(V)-x(i-1,j)|+|G\_est(V)-x(i+1,j)|+|x(i-3,j)-x(i-1,j)|+|x(i+3,j)-x(i+1,j)|\}+|x(i-2,j-1)-x(i,j-1)|+|x(i+2,j-1)-x(i,j-1)|+|x(i-2,j+1)-x(i,j+1)|+|x(i+2,j+1)-x(i,j+1)|$$

where G_est(H) and G_est(V) denote the interpolated G values in the horizontal and vertical directions, respectively, as discussed above.

Then, in one embodiment, the technique uses the following rule to determine the interpolation direction:
If (AH−AV)←Th, then use horizontal interpolation filters;
Else, if (AH−AV)>Th, then use vertical interpolation filters;
Else, use non-directional filters.
Th is a threshold parameter, whose value determines the width of the "deadzone" for which the difference between horizontal and vertical activities is not large enough to justify directional interpolation. For 8-bit pixel component values (in the range 0.255), it was found that a good choice for the threshold is Th=20, but the choice is not critical (any value in the range 10<Th<40 leads to similar performance for most images).

For pixels in the G1 locations (710 of FIG. 7) (green pixels at red rows and blue columns), the technique computes the activity estimators by $$AH=2*\{|R\_est(H)-x(i,j-1)|+|R\_est(H)-x(i,j+1)|+|x(i,j-3)-x(i,j-1)|+|x(i,j+3)-x(i,j+1)|\}+|x(i-1,j-2)-x(i-1,j)|+|x(i-1,j+2)-x(i-1,j)|+|x(i+1,j-2)-x(i+1,j)|+|x(i+1,j+2)-x(i+1,j)|$$

$$AV=2*\{|B\_est(V)-x(i-1,j)|+|B\_est(V)-x(i+1,j)|+|x(i-3,j)-x(i-1,j)|+|x(i+3,j)-x(i+1,j)|\}+|x(i-2,j-1)-x(i,j-1)|+|x(i+2,j-1)-x(i,j-1)|+|x(i-2,j+1)-x(i,j+1)|+|x(i+2,j+1)-x(i,j+1)|$$

and for pixels in the G2 locations (712 of FIG. 7) (green pixels at blue rows and red columns), the technique computes the activity estimators by $$AH=2*\{|B\_est(H)-x(i,j-1)|+|B\_est(H)-x(i,j+1)|+|x(i,j-3)-x(i,j-1)|+|x(i,j+3)-x(i,j+1)|\}+|x(i-1,j-2)-x(i-1,j)|+|x(i-1,j+2)-x(i-1,j)|+|x(i+1,j-2)-x(i+1,j)|+|x(i+1,j+2)-x(i+1,j)|$$

$$AV=2*\{|R\_est(V)-x(i-1,j)|+|R\_est(V)-x(i+1,j)|+|x(i-3,j)-x(i-1,j)|+|x(i+3,j)-x(i+1,j)|\}+|x(i-2,j-1)-x(i,j-1)|+|x(i+2,j-1)-x(i,j-1)|+|x(i-2,j+1)-x(i,j+1)|+|x(i+2,j+1)-x(i,j+1)|$$

It was found experimentally that the former non-directional filters do not perform as well for interpolation at green locations (where R and B are missing), thus, in one embodiment the decision rule was changed to consider only horizontal or vertical interpolation:
If AV>AH, then use horizontal interpolation filters;
Else, use vertical interpolation filters.

1.5.4 Reduction of Sprinkling Artifacts

With the use of directional filters and correction of bilinear interpolation estimates via high-frequency components, as discussed above, the adaptive interpolation with artifact reduction technique basically eliminates "zipper" artifacts. Most "color sprinkling" artifacts are also eliminated by the new interpolation direction decision rule employed by the adaptive interpolation with artifact reduction technique, because the sprinkling artifacts were mostly generated by incorrect interpolation direction decisions.

There is still a case where the adaptive interpolation with artifact reduction technique may generate sprinkling artifacts: diagonal edges close to 45 degrees, in which only one of the R or B colors change significantly. That would be the case, for example, of an object with a diagonal edge in front of a light gray background, with the object color being close to blue, yellow, red, or cyan (that is, with only R or B values changing significantly across the edge). In such cases the direction decision rule will see significant activity in both vertical and horizontal directions, and will then select non-directional interpolation. Recall that in that case the G interpolation filters have the shape 802 (for R locations) shown in FIG. 8.

Figure 8:
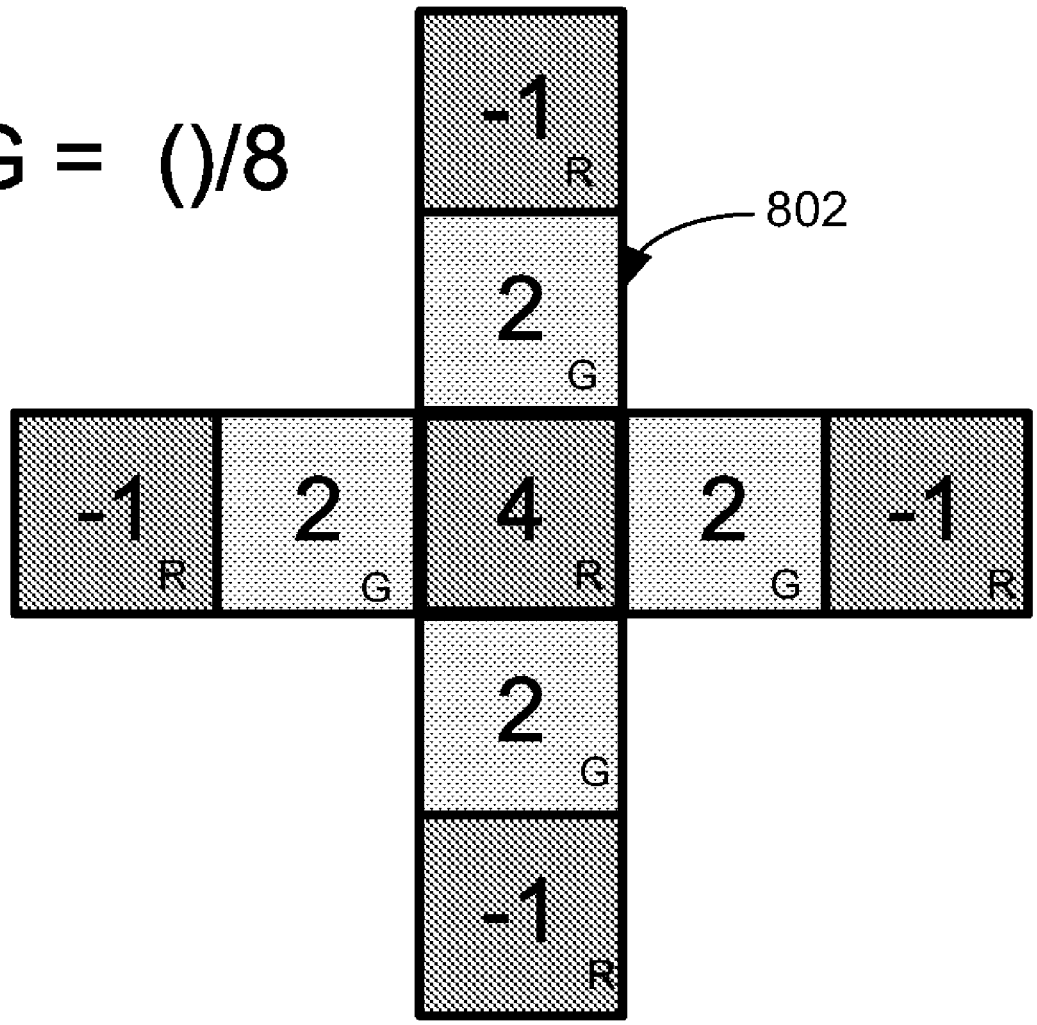
FIG. 8 provides an exemplary diagram of a non-directional filter for interpolating green in red locations employed in one exemplary embodiment of the adaptive interpolation with artifact reduction technique.

The interpolated green value is obtained by G_est=G_eb+G_ec, where G_eb is the bilinearly interpolated component (from the green pixels in FIG. 8) and G_ec the high-frequency correction (from the red pixels in FIG. 8). In the case of a diagonal edge where R changes significantly and the filter above is at the edge, then the pixels with −1 gain to the right and below the center pixel have very different values from those in the center and to the left and above (or vice versa). Thus, G_ec will have a large magnitude, leading to an estimated green value G_est that is either too high or too low. The neighboring pixels will be interpolated with different filters, and will likely not suffer the same effect. Thus, the result is an isolated pixel with an interpolation error, leading to either a bright or dark "color sprinkling" artifact.

The adaptive interpolation with artifact reduction technique can reduce such artifacts by limiting the amount of correction that can be applied to bilinear interpolation in the case of non-directed interpolation. In other words, the technique applies an attenuation factor to the G_ec component. In the previous adaptive demosaicing algorithm described in application Ser. No. 11/046,324 filed Jan. 29, 2005 and entitled "A SYSTEM AND METHOD FOR ADAPTIVE INTERPOLATION OF IMAGES FROM PATTERNED SENSORS", G_ec was changed depending on the values of the activity indicators, but here the adaptive interpolation with artifact reduction technique uses an improved rule based on the value of G_ec. Additionally, the technique only applies this nonlinear operator for non-directed interpolation.

The adaptive interpolation with artifact reduction technique uses a simple rule: if |G_ec|≦Mx, where Mx is a parameter, the technique does not alter its value. If |G_ec|>Mx, then the technique attenuates the correction (for example, in one working embodiment, by a factor of four), while preserving continuity of the transfer function. That can be achieved, for example, for G_ec>Mx, by the transfer function G_ec_new=Mx+(G_ec_old−Mx)*C, where C is a gain factor typically set to b a positive number less than one (for example, C=¼).

For one exemplary working embodiment of the adaptive interpolation with artifact reduction technique, for 8-bit pixel values, Mx=6 and C=¼ lead to the best compromise, with a significant reduction of color sprinkling for diagonal chrominance edges and only a small penalty (<10%) in mean-square error.

Note that by attenuating the correction for the estimated green component, the technique automatically attenuates the correction for the second interpolated color as well, because its value depends on the interpolated green value, as per the formulas above. This is important, because if the technique corrected the green and the second color (red or blue) differently, that would lead to a color change for that pixel.

1.5.4 Exemplary Demosaicing Psuedo-Code Implementation

From the discussion above, a succinct description for an exemplary pseudo-code implementation of one embodiment of the adaptive interpolation with artifact reduction technique is as follows:

The technique has pointers to arrays {R(i,j), G(i,j), B(i,j)} that should hold the output interpolated image.

For simplicity, the technique assumes that the input raw image is available in array x(i,j). If a minimal memory footprint is desired, the technique can pre-populate the RGB arrays with the known raw values, instead.

For i=0, #rows−1
  For j=0, #columns−1
    Depending on the Bayer pattern (different cameras use different 2×2 patterns), determine which of the four possible kinds of pixel location corresponds to the current (i,j) indices.
    If (i,j) is a red pixel:
      Set R(i,j)=x(i,j) (known value).
      Compute the G_est(H), B_est(H), G_est(V), and B_est(V).
      Compute AH(G_Est,x) and AV(G_Est,x) as above and decide on interpolation direction;
        if direction is H, set G(i,j)=G_est(H) and B(i,j)=B_est(H).
        if direction is V, set G(i,j)=G_est(V) and B(i,j)=B_est(V).
        if non-directional is selected, compute G(i,j) and B(i,j) by the non-directional filters above, with possible lamping of the green correction.
    If (i,j) is a blue pixel:
      Set B(i,j)=x(i,j) (known value).
      Compute the G_est(H), R_est(H), G_est(V), and R_est(V).
      Compute AH(G_Est,x) and AV(G_Est,x) as above and decide on interpolation direction;
        if direction is H, set G(i,j)=G_est(H) and R(i,j)=R_est(H).
        if direction is V, set G(i,j)=G_est(V) and R(i,j)=R_est(V).
        if non-directional is selected, compute G(i,j) and R(i,j) by the non-directional filters above, with possible lamping of the green correction.
    If (i,j) is a G1 pixel (green pixels at red row and blue column):
      Set G(i,j)=x(i,j) (known value).
      Compute the R_est(H), B_est(H), R_est(V), and B_est(V).
      Compute AH(R_Est,x) and AV(B_Est,x) as above and decide on interpolation direction;
        if direction is H, set R(i,j)=R_est(H) and B(i,j)=B_est(H).
        if direction is V, set R(i,j)=R_est(V) and B(i,j)=B_est(V).
    If (i,j) is a G2 pixel (green pixels at blue row and red column):
      Set G(i,j)=x(i,j) (known value).
      Compute the R_est(H), B_est(H), R_est(V), and B_est(V).
      Compute AH(B_Est,x) and AV(R_Est,x) as above and decide on interpolation direction;
        if direction is H, set R(i,j)=R_est(H) and B(i,j)=B_est(H).
        if direction is V, set R(i,j)=R_est(V) and B(i,j)=B_est(V).
  End j loop
End i loop In an actual implementation, the best loop structure and data structures depend on the best way to architect the Application Programming Interface (API), depending on memory considerations, and similar factors. For an efficient implementation with minimum code duplication, the technique can avoid a big "switch" statement that process each of the four cases separately. Rather, the technique can use the same filtering code for all cases, with a few "if" statements to control key parameters.

It is relatively easy to implement the technique in a streaming API; for that the technique needs just enough memory to hold seven scan lines. Also, in practice, in one embodiment of the technique, padding is applied (e.g., 3 pixels to all borders of the image, with symmetric data reflection), so that no testing needs to be performed to detect whether the current pixel (i,j) is too close to a border for the filters to be changed.

The adaptive interpolation with artifact reduction technique is suitable for practical applications, but this technique has a reduced complexity over present state-of-the art interpolation techniques, because it can be implemented in a single pass over an image, with no additional buffers needed. The technique uses not only horizontal and vertical interpolations, but also non-directed interpolation, with the extra step of a nonlinear curve being applied to the high-frequency correction term. Thus, the adaptive interpolation with artifact reduction technique described herein leads to reduced color sprinkling artifacts.

2.0 The Computing Environment

The adaptive interpolation with artifact reduction technique is designed to operate in a computing environment. The following description is intended to provide a brief, general description of a suitable computing environment in which the adaptive interpolation with artifact reduction technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, digital cameras, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 9:
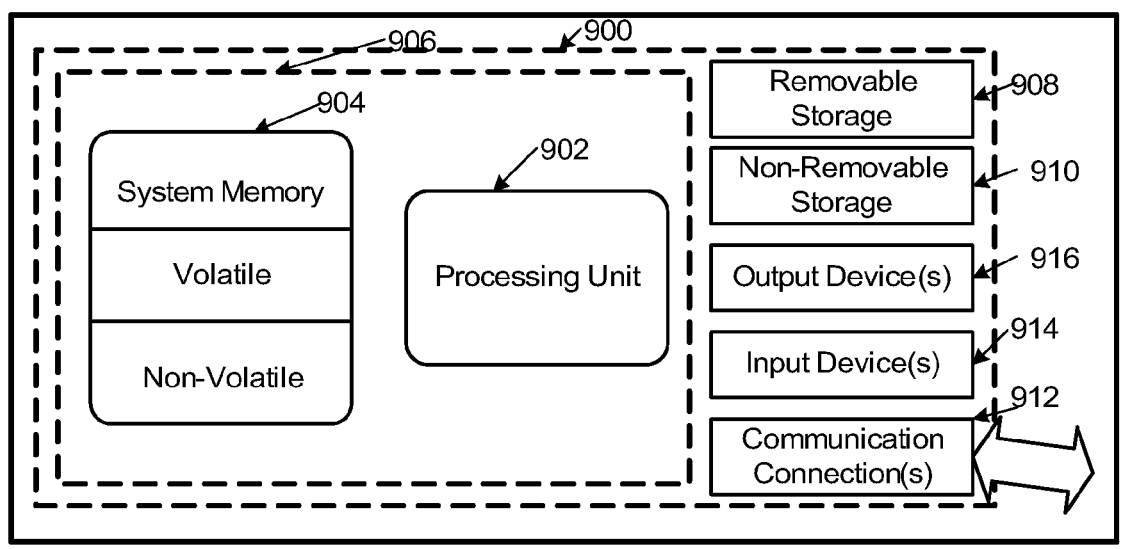
FIG. 9 provides and exemplary computing environment in which the adaptive interpolation with artifact reduction technique can be practiced.

FIG. 9 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 9, an exemplary system for implementing the adaptive interpolation with artifact reduction technique includes a computing device, such as computing device 900. In its most basic configuration, computing device 900 typically includes at least one processing unit 902 and memory 904. Depending on the exact configuration and type of computing device, memory 904 may be volatile (such as RAM), non-volatile (such as ROM, flash memory, etc.) or some combination of the two. This most basic configuration is illustrated in FIG. 9 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 9 by removable storage 908 and non-removable storage 910. Computer storage media includes volatile and nonvolatile, removable and non-removable media implemented in any method or technology for storage of information such as computer readable instructions, data structures, program modules or other data. Memory 904, removable storage 908 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 900. Any such computer storage media may be part of device 900.

Device 900 may also contain communications connection(s) 912 that allow the device to communicate with other devices. Communications connection(s) 912 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 900 may have various input device(s) 914 such as a display, a keyboard, mouse, pen, camera, touch input device, and so on. Output device(s) 916 such as speakers, a printer, and so on may also be included. All of these devices are well known in the art and need not be discussed at length here.

The adaptive interpolation with artifact reduction technique may be described in the general context of computer-executable instructions, such as program modules, being executed by a computing device. Generally, program modules include routines, programs, objects, components, data structures, and so on, that perform particular tasks or implement particular abstract data types. The adaptive interpolation with artifact reduction technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. An adaptive filter interpolation process for interpolating missing color values at a given pixel in a mosaiced color image, comprising:
   using a computer to perform the steps of:
      selecting a current pixel having a current color and location from a mosaiced color image;
      for the current pixel location and color, computing gradients in a horizontal and a vertical direction;
      for the current pixel and location, computing an activity metric in a horizontal direction and an activity metric in a vertical direction that takes into account candidate output interpolated pixels, wherein the process action of computing activity metrics in the horizontal and vertical directions that takes into account candidate output interpolated pixels, further comprises:
         computing horizontal and vertical estimates for the missing color values at the current pixel; and
         measuring the absolute difference between the computed horizontal and vertical estimates of the missing color values at the current pixel and the colors of the immediate neighbors of the current pixel to determine the activity metrics in the horizontal and vertical directions;
      using the computed gradients in the horizontal and vertical directions, and the activity metrics in the horizontal and vertical directions, to choose the best interpolation filters from a small set of predetermined interpolation filters; and
      computing an interpolation of the missing color values at the current pixel with the selected interpolation filters.

2. The process of claim 1 wherein said small set of predetermined filters comprises:
   filters that perform interpolation across the horizontal direction;
   filters that perform interpolation across the vertical direction; and non-directional filters whose interpolation does not weigh either the horizontal or vertical directions more.

3. The process of claim 2 further comprising attenuating a term that contributes to high frequency pixel values in an interpolated output of the interpolation filters.

4. The process of claim 3 wherein the interpolation filters are non-directional filters and the attenuated term relates to green pixel values.

5. The process of claim 2 wherein all missing color data is interpolated by one computational sequence for each pixel of the image.

6. An adaptive filter interpolation process for interpolating missing color values at a given pixel in a mosaiced color image, comprising:
  using a computer to perform the steps of:
    selecting a pixel having a current color and location from a mosaiced color image;
    for the pixel location and color, computing gradients in the horizontal and vertical directions;
    computing activity metrics in the horizontal and vertical directions, AH and AV respectively, that take into account candidate output interpolated pixels;
    using the computed gradients in the horizontal and vertical directions, and the activity metrics in the horizontal and vertical directions, to choose the best interpolation filters from a small set of predetermined interpolation filters of horizontal, vertical and non-directional filters;
    if a non-directed interpolation filter is selected, determining if a term, G_ec, in the selected non-directed interpolation filter that contributes to the high frequency components of the interpolated output should be attenuated and attenuating G_ec if |G_ec|<Mx, where Mx is a specified parameter, and not attenuating G_ec if |G_ec|>Mx; and
    computing an interpolation of the missing color values at the current pixel with the selected interpolation filters.

7. The process of claim 1 wherein:
  if the horizontal activity metric minus the vertical activity metric is less than the negative value of a threshold Th, filters are chosen that perform interpolation across the horizontal direction;
  if the horizontal activity metric minus the vertical activity metric is greater than the threshold Th, filters are chosen that perform interpolation across the vertical direction;
  else
  non-directional filters are chosen.

8. The process of claim 1, wherein for a pixel pattern employing red R, green G, and blue B pixels arranged in seven rows, with a first pixel 3-pixel row of pixels B, G, B, a second 3-pixel row of G, R, G directly below the first 3-pixel row, a third 7-pixel row starting two pixels to the left of the first row of pixels of B, G, B, G, B, G, B, a fourth 7-pixel row aligned with the third pixel row of pixels G, R, G, R, G, R, G, a fifth 7-pixel row aligned with the fourth pixel row of B, G, B, G, B, G, B, a sixth 3-pixel row, aligned with the first 3 pixel row, of G,R,G and a seventh 3-pixel row of B,G, B aligned with the sixth 3-pixel row, at the red pixel in the center of the fourth pixel row at position (i,j) with pixel value at row i and column j, and all pixels in the other rows and columns being relative to the red pixel in the center of the fourth pixel row, the interpolation filters at the red pixel at (i,j) are found by:
  computing the horizontal interpolation filter for green as G_est=G_eb+G_ec, with G_eb=⅛*{3*[x(i,j−1)+x(i,j+1)]+[x(i,j−3)+x(i,j+3)]} and G_ec=¼*{2*x(i,j)−x(i,j−2)−x(i,j+2)};
  computing the horizontal interpolation for blue as B_est=G_est+(B−G)_est, with (B−G)_est=¹⁄₁₆*{3*[x(i−1,j−1)+x(i−1,j+1)+x(i+1,j−1)+x(i+1,j+1)]+[x(i−1,j−3)+x(i−1,j+3)+x(i+1,j−3)+x(i+1,j+3)]}−⅛*{2*[x(i−1,j)+x(i+1,j)]+[x(i−1,j−2)+x(i−1, j+2)+x(i+1,j−2)+x(i+1,j+2)]};
  computing the vertical interpolation for green as G_est=G_eb+G_ec, with G_eb=⅛*{3*[x(i−1,j)+x(i+1,j)]+[x(i−3,j)+x(i+3,j)]} and G_ec=¼*{2*x(i,j)−x(i−2,j)−x(i+2,j)};
  computing the vertical interpolation filter for blue as B_est=G_est+(B−G)_est, with (B−G)_est=¹⁄₁₆*{3*[x(i−1,j−1)+x(i−1,j+1)+x(i+1,j−1)+x(i+1,j+1)]+[x(i−3,j−1)+x(i−3,j+1)+x(i+3,j−1)+x(i+3,j+1)]}−⅛*{2*[x(i,j−1)+x(i,j+1)]+[x(i−2,j−1)+x(i−2,j+1)+x(i+2,j−1)+x(i+2,j+1)]};
  computing the non-directional interpolation filter for green as G_est=G_eb+G_ec, with G_eb=⅛*{4*x(i,j)−[x(i−2,j)+x(i+2,j)+x(i,j−2)+x(i,j+2)]} and G_ec=¼*{x(i−1,j)+x(i,j−1)+x(i,j+1)+x(i+1,j)}; and
  computing the non-directional interpolation filter for blue as B_est=G_est+¼*{[x(i−1,j−1)+x(i−1,j+1)+x(i+1,j−1)+x(i+1,j+1)]−[x(i−1,j)+x(i,j−1)+x(i,j+1)+x(i+1,j)]}.

9. The process of claim 1, wherein for a pixel pattern employing red R, green G, and blue B pixels arranged in seven rows, with a first pixel 1-pixel row of a G pixel, a second 3-pixel row starting one pixel to the left of the first row of G, R, G directly below the first pixel row, a third 5-pixel row starting one pixel to the left of the second row of pixels of G, B, G, B, G, a fourth 7-pixel row starting one pixel to the left of the third pixel row of pixels G, R, G, R, G, R, G, a fifth 5-pixel row starting one pixel to the right of fourth pixel row of G, B, G, B, G, a sixth 3-pixel row, aligned with the second 3-pixel row, of G,B,G and a seventh 1-pixel row of G aligned with the first 1-pixel row, at the red pixel in the center of the fourth pixel row at position (i,j) with pixel value at row i and column j, and all pixels in the other rows and columns being relative to the red pixel in the center of the fourth pixel row, computing the horizontal and vertical activity metrics further comprises,
  computing the horizontal activity metric, AH, where AH=2*{|G_est(H)−x(i,j−1)|+|G_est(H)−x(i,j+1)|+|x(i,j−3)−x(i,j−1)|+|x(i,j+3)−x(i,j+1)|}+|x(i−1,j−2)−x(i−1,j)|+|x(i−1,j+2)−x(i−1,j)|+|x(i+1,j−2)−x(i+1,j)|+|x(i+1,j+2)−x(i+1,j)|; and
  computing the vertical activity metric, AV, where AV=2*{|G_est(V)−x(i−1,j)|+|G_est(V)−x(i+1,j)|+|x(i−3,j)−x(i−1,j)|+|x(i+3,j)−x(i+1,j)|}+|x(i−2,j−1)−x(i,j−1)|+|x(i+2,j−1)−x(i,j−1)−+|x(i−2,j+1)−x(i,j+1)|+|x(i+2,j+1)−x(i,j+1)|
where G_est(H) and G_est(V) denote interpolated green (G) values in the horizontal and vertical directions.

10. The process of claim 1, wherein for a pixel pattern employing red R, green G, and blue B pixels arranged in seven rows, with a first pixel 3-pixel row of pixels R, G, R, a 3-pixel row of G, B, G directly below the first 3-pixel row, a third 7-pixel row starting two pixels to the left of the first row of pixels of R, G, R, G, R, G, R, a fourth 7-pixel row aligned with the third pixel row of pixels G, B, G, B, G, B, G, a fifth 7-pixel row aligned with the fourth pixel row of R, G, R, G, R, G, R, a sixth 3-pixel row, aligned with the first 3 pixel row, of G, B, G and a seventh 3-pixel row of R,G, R aligned with the sixth 3-pixel row, for a blue pixel in the center of the fourth pixel row at position (i,j) with pixel value at row i and column j, and all pixels in the other rows and columns being relative to the blue pixel in the center of the fourth pixel row, the interpolation filter for the blue pixel at (i,j) are found by:

computing the horizontal interpolation filter for green as G_est=G_eb+G_ec, with G_eb=⅛*{3*[x(i,j−1)+x(i,j+1)]+[x(i,j−3)+x(i,j+3)]} and G_ec=¼*{2*x(i,j)−x(i,j−2)−x(i,j+2)};

computing the horizontal interpolation filter for red as R_est=G_est+(R−G)_est, with (R−G)_est=¹⁄₁₆*{3*[x(i−1,j−1)+x(i−1,j+1)+x(i+1,j−1)+x(i+1,j+1)]+[x(i−1,j−3)+x(i−1,j+3)+x(i+1,j−3)+x(i+1,j+3)]}−⅛*{2*[x(i−1,j)+x(i+1,j)+[x(i−1,j−2)+x(i−1,j+2)+x(i+1,j−2)+x(i+1,j+2)]};

computing the vertical interpolation filter for green as G_est=G_eb+G_ec, with G_eb=⅛*{3*[x(i−1,j)+x(i+1,j)]+[x(i−3,j)+x(i+3,j)]} and G_ec=¼*{2*x(i,j)−x(i−2,j)−x(i+2,j)};

computing the vertical interpolation filter for red as R_est=G_est+(R−G)_est, with (R−G)_est=¹⁄₁₆*{3*[x(i−1,j−1)+x(i−1,j+1)+x(i+1,j−1)+x(i+1,j+1)]+[x(i−3,j−1)+x(i−3,j+1)+x(i+3,j−1)+x(i+3,j+1)]}−⅛*{2*[x(i,j−1)+x(i,j+1)]+[x(i−2,j−1)+x(i−2,j+1)+x(i+2,j−1)+x(i+2,j+1)]};

computing the non-directional filter for green as G_est=G_eb+G_ec, with G_eb=⅛*{4*x(i,j)−[x(i−2,j)+x(i+2,j)+x(i,j−2)+x(i,j+2)]} and G_ec=¼*{x(i−1,j)+x(i,j−1)+x(i,j+1)+x(i+1,j)}, and computing the non-directional filter for red as R_est=G_est+¼*{[x(i−1,j−1)+x(i−1,j+1)+x(i+1,j−1)+x(i+1,j+1)]−[x(i−1,j)+x(i,j−1)+x(i,j+1)+x(i+1,j)]}.

11. The process of claim 1, wherein for a pixel pattern employing red R, green G, and blue B pixels arranged in seven rows, with a first pixel 1-pixel row of a G pixel, a second 3-pixel row starting one pixel to the left of the first row of G, B, G directly below the first pixel row, a third 5-pixel row starting one pixel to the left of the second row of pixels of G, R, G, R, G, a fourth 7-pixel row starting one pixel to the left of the third pixel row of pixels G, B, G, B, G, B, G, a fifth 5-pixel row starting one pixel to the right of fourth pixel row of G, R, G, R, G, a sixth 3-pixel row, aligned with the second 3-pixel row, of G,B,G and a seventh 1-pixel row of B aligned with the first 1-pixel row, at the blue pixel in the center of the fourth pixel row at position (i,j) with pixel value at row i and column j, and all pixels in the other rows and columns being relative to the red pixel in the center of the fourth pixel row, computing the horizontal and vertical activity metrics further comprises, computing the horizontal activity metric AH where AH=2*{|G_est(H)−x(i,j−1)|+|G_est(H)−x(i,j+1)|+|x(i,j−3)−x(i,j−1)|+|x(i,j+3)−x(i,j+1)|}+|x(i−1,j−2)−x(i−1,j)|+|x(i−1,j+2)−x(i−1,j)|+|x(i+1,j−2)−x(i+1,j)|+|x(i+1,j+2)−x(i+1,j)|; and computing the vertical activity metric where AV=2*{|G_est(V)−x(i−1,j)|+|G_est(V)−x(i+1,j)|+|x(i−3,j)−x(i−1,j)|+|x(i+3,j)−x(i+1,j)|}+|x(i−2,j−1)−x(i,j−1)|+|x(i+2,j−1)−x(i,j−1)|+|x(i−2,j+1)−x(i,j+1)|+|x(i+2,j+1)−x(i,j+1)| where G_est(H) and G_est(V) denote the interpolated green (G) values in the horizontal and vertical directions.

12. The process of claim 1, wherein for a pixel pattern employing red R, green G, and blue B pixels arranged in seven rows, with a first pixel 3-pixel row of pixels G, B, G a 3-pixel row of R, G, R directly below the first 3-pixel row, a third 7-pixel row starting two pixels to the left of the first row of pixels of G,B, G, B, G, B, G, a fourth 7-pixel row aligned with the third pixel row of pixels R, G, R, G, R, G, R, a fifth 7-pixel row aligned with the fourth pixel row of G, B, G, B, G, B, G, a sixth 3-pixel row, aligned with the first 3-pixel row, of R, G, R and a seventh 3-pixel row of G,B,G aligned with the sixth 3-pixel row, for a green pixel in the center of the fourth pixel row at position (i,j) with pixel value at row i and column j, and all pixels in the other rows and columns being relative to the green pixel in the center of the fourth pixel row, the interpolation filter for the green pixel at (i,j) are found by:

computing the horizontal interpolation filter for red as R_est=R_eb+R_ec, with R_eb=⅛*{3*[x(i,j−1)+x(i,j+1)]+[x(i,j−3)+x(i,j+3)]} and R_ec=¼*{2*x(i,j)−x(i,j−2)−x(i,j+2)};

computing the horizontal interpolation filter for blue as B_est=R_est+(B−R)_est, with (B−R)_est=¹⁄₁₆*{3*[x(i−1,j−1)+x(i−1,j+1)+x(i+1,j−1)+x(i+1,j+1)]+[x(i−1,j−3)+x(i−1,j+3)+x(i+1,j−3)+x(i+1,j+3)]}−⅛*{2*[x(i−1,j)+x(i+1,j)]+[x(i−1,j−2)+x(i−1,j+2)+x(i+1,j−2)+x(i+1,j+2)]};

computing the vertical interpolation filter for blue as B_est=B_eb+B_ec, with B_eb=⅛*{3*[x(i−1,j)+x(i+1,j)]+[x(i−3,j)+x(i+3,j)]} and B_ec=¼*{2*x(i,j)−x(i−2,j)−x(i+2,j)};

computing the vertical interpolation filter for red as R_est=B_est+(R−B)_est, with (R−B)_est=¹⁄₁₆*{3*[x(i−1,j−1)+x(i−1,j+1)+x(i+1,j−1)+x(i+1,j+1)]+[x(i−3,j−1)+x(i−3,j+1)+x(i+3,j−1)+x(i+3,j+1)]}−⅛*{2*[x(i,j−1)+x(i,j+1)]+[x(i−2,j−1)+x(i−2,j+1)+x(i+2,j−1)+x(i+2,j+1)]}.

13. The process of claim 1, wherein for a pixel pattern employing red R, green G, and blue B pixels arranged in seven rows, with a first pixel 1-pixel row of a R pixel, a second 3-pixel row starting one pixel to the left of the first row of R, G R directly below the first pixel row, a third 5-pixel row starting one pixels to the left of the second row of pixels of B, G, B, G, B, a fourth 7-pixel row starting one pixel to the left of the third pixel row of pixels R, G, R, G, R, G, R, a fifth 5-pixel row starting one pixel to the right of fourth pixel row of B, G, B, G, B, a sixth 3-pixel row, aligned with the second 3-pixel row, of R,B,R and a seventh 1-pixel row of R aligned with the first 1-pixel row, at the green pixel in the center of the fourth pixel row at position (i,j) with pixel value at row i and column j, and all pixels in the other rows and columns being relative to the green pixel in the center of the fourth pixel row, wherein computing the horizontal and vertical activity metrics further comprises, computing the horizontal activity metric, AH, as AH=2*{|R_est(H)−x(i,j−1)|+|R_est(H)−x(i,j+1)|+|x(i,j−3)−x(i,j−1)|+|x(i,j+3)−x(i,j+1)|}+|x(i−1,j−2)−x(i−1,j)|+|x(i−1,j+2)−x(i−1,j)|+|x(i+1,j−2)−x(i+1,j)|+|x(i+1,j+2)−x(i+1,j)|; and computing the vertical activity metric, AV, as AV=2*{|B_est(V)−x(i−1,j)|+|B_est(V)−x(i+1,j)|+|x(i−3,j)−x(i−1,j)|+|(i+3,j)−x(i+1,j)|}+|x(i−2,j−1)−x(i,j−1)|+|x(i+2,j−1)−x(i,j−1)|+|x(i−2,j+1)−x(i,j+1)|+|x(i+2,j+1)−x(i,j+1)| where R_est(H) denotes the interpolated red (R) value in the horizontal and B_est(V) denotes the interpolated blue value in the vertical direction.

14. The process of claim 1, wherein for a pixel pattern employing red R, green G, and blue B pixels arranged in seven rows, with a first pixel 3-pixel row of pixels G, R, G a 3-pixel row of B, G, B directly below the first 3-pixel row, a third 7-pixel row starting two pixels to the left of the first row of pixels of G, R, G, R, G, R, G, a fourth 7-pixel row aligned with the third pixel row of pixels B, G, B, G, B, G, B, a fifth 7-pixel row aligned with the fourth pixel row of G, R, G, R, G, R, G, a sixth 3-pixel row, aligned with the first 3-pixel row, of B, G, B and a seventh 3-pixel row of G, R,G aligned with the sixth 3-pixel row, for a green pixel in the center of the fourth pixel row at position (i,j) with pixel value at row i and column j, and all pixels in the other rows and columns being relative to the green pixel in the center of the fourth pixel row, the interpolation filter for the green pixel at (i,j) are found by:

computing the horizontal interpolation filter for red as R_est=B_est+(B−R)_est, with (B−R)_est=1/16*{3*[x(i−1,j−1)+x(i−1,j+1)+x(i+1,j−1)+x(i+1,j+1)]+[x(i−1,j−3)+x(i−1,j+3)+x(i+1,j−3)+x(i+1,j+3)]}−1/8*{2*[x(i−1,j)+x(i+1,j)+[x(i−1,j−2)+x(i−1,j+2)+x(i+1,j−2)+x(i+1,j+2)]};

computing the horizontal interpolation for blue as B_est=G_est+(B−G)_est, with (B−G)_est=1/16*{3*[x(i−1,j−1)+x(i−1,j+1)+x(i+1,j−1)+x(i+1,j+1)]+[x(i−1,j−3)+x(i−1,j+3)+x(i+1,j−3)+x(i+1,j+3)]}−1/8*{2*[x(i−1,j)+x(i+1,j)+[x(i−1,j−2)+x(i−1, j+2)+x(i+1,j−2)+x(i+1,j+2)]};

computing the vertical interpolation filter for red as R_est=B_est+(R−B)_est, with (R−B)_est=1/16*{3*[x(i−1,j−1)+x(i−1,j+1)+x(i+1,j−1)+x(i+1,j+1)]+[x(i−3,j−1)+x(i−3,j+1)+x(i+3,j−1)+x(i+3,j+1)]}−1/8*{2*[x(i,j−1)+x(i,j+1)]+[x(i−2,j−1)+x(i−2, j+1)+x(i+2,j−1)+x(i+2,j+1)]}.

15. The process of claim 1, wherein for a pixel pattern employing red R, green G, and blue B pixels arranged in seven rows, with a first pixel 1-pixel row of a B pixel, a second 3-pixel row starting one pixel to the left of the first row of B, G B directly below the first pixel row, a third 5-pixel row starting one pixel to the left of the second row of pixels of R, B, R, B, G, a fourth 7-pixel row starting one pixel to the left of the third pixel row of pixels B, G, B, G, B, G, B, a fifth 5-pixel row starting one pixel to the right of fourth pixel row of R, G, R, G, R, a sixth 3-pixel row, aligned with the second 3-pixel row, of B,G,B and a seventh 1-pixel row of B aligned with the first 1-pixel row, at the green pixel in the center of the fourth pixel row at position (i,j) with pixel value at row i and column j, and all pixels in the other rows and columns being relative to the green pixel in the center of the fourth pixel row, computing the horizontal and vertical activity metrics further comprises, computing the horizontal activity metric, AH, as AH=2*{|B_est(H)−x(i,j−1)|+|B_est(H)−x(i,j+1)|+|x(i,j−3)−x(i,j−1)|+|x(i,j+3)−x(i,j+1)|}+|x(i−1,j−2)−x(i−1,j)|+|x(i−1,j+2)−x(i−1,j)|+|x(i+1,j−2)−x(i+1,j)|+|x(i+1,j+2)−x(i+1,j)|;

computing the vertical activity metric, AV, as AV=2*{|R_est(V)−x(i−1,j)|+|R_est(V)−x(i+1,j)|+|x(i−3,j)−x(i−1,j)|+|x(i+3,j)−x(i+1,j)|}|x(i−2,j−1)−x(i,j−1)|+|x(i+2,j−1)−x(i,j−1)|+|x(i−2,j+1)−x(i,j+1)|+|x(i+2,j+1)−x(i,j+1)| where B_est(H) denotes the interpolated blue (B) values in the horizontal direction and R_est(V) denote the interpolated red (R) values in the horizontal and vertical directions.

16. An adaptive filter interpolation system for interpolating a missing color value at a given pixel in a color image, comprising:

a general purpose computing device; and a computer program comprising program modules executable by the computing device, wherein the computing device is directed by the program modules of the computer program to, select a current pixel having a current color from an image sensor array that represents a color image;

for the selected pixel, compute the gradient in the horizontal and vertical directions;

compute a horizontal activity metric (AH) in the horizontal direction and a vertical activity metric (AV) in the vertical direction, the horizontal activity metric and vertical activity metric taking into account candidate output interpolated pixel values by computing horizontal and vertical estimates for the missing color values at the current pixel, and measuring the absolute difference between the computed horizontal and vertical estimates of the missing color values at the current pixel and the colors of the immediate neighbors of the current pixel to determine the activity metrics in the horizontal and vertical directions;

use the gradients in the horizontal and vertical directions, the horizontal activity metric and the vertical activity metric to select filters from a set of filters; and compute an interpolation of the missing color values at the current pixel using the selected filter.

17. The system of claim 16 wherein the module that selects filters selects:

horizontal interpolation filters, if AV>AH;

vertical interpolation filters otherwise.

18. The system of claim 16 wherein the module that selects filters selects:

selects horizontal interpolation filters If (AH−AV)←Th, where Th is a specified threshold;

selects vertical interpolation filters if (AH−AV)≧Th; and otherwise selects non-directional interpolation filters.

* * * * *

UNITED STATES PATENT AND TRADEMARK OFFICE
CERTIFICATE OF CORRECTION

| | | |
|---|---|---|
| PATENT NO. | : 8,165,389 B2 | Page 1 of 1 |
| APPLICATION NO. | : 12/133402 | |
| DATED | : April 24, 2012 | |
| INVENTOR(S) | : Malvar et al. | |

It is certified that error appears in the above-identified patent and that said Letters Patent is hereby corrected as shown below:

On Title Page 2, in Item [56] under "Other Publications" column 2, line 6, delete "digitial" and insert -- digital --, therefor.

In the Specification

Column 3, line 22, after "technique" insert -- . --.

Column 13, line 16, delete "b" and insert -- be --, therefor.

In the Claims

Column 21, line 26, Claim 15, delete "G B" and insert -- G.B, --, therefor.

Signed and Sealed this
Seventeenth Day of February, 2015

Michelle K. Lee
*Deputy Director of the United States Patent and Trademark Office*